(12) United States Patent
Brown et al.

(10) Patent No.: US 8,196,086 B2
(45) Date of Patent: Jun. 5, 2012

(54) GRANULAR CHANNEL WIDTH FOR POWER OPTIMIZATION

(75) Inventors: Jeffrey S. Brown, Fort Collins, CO (US); Jonathan W. Byrn, Fort Collins, CO (US); Mark F. Turner, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/840,535

(22) Filed: Jul. 21, 2010

(65) Prior Publication Data
US 2012/0023473 A1    Jan. 26, 2012

(51) Int. Cl.
*G06F 17/50* (2006.01)

(52) U.S. Cl. ........ 716/133; 716/119; 716/120; 716/126; 716/130; 716/136; 716/139

(58) Field of Classification Search .................. 716/119, 716/120, 126, 130, 133, 135, 136, 139
See application file for complete search history.

(56) References Cited

U.S. PATENT DOCUMENTS

| | | | | |
|---|---|---|---|---|
| 5,068,548 | A * | 11/1991 | El Gamel | 326/58 |
| 5,157,618 | A * | 10/1992 | Ravindra et al. | 716/50 |
| 5,350,704 | A * | 9/1994 | Anderson et al. | 438/129 |
| 5,451,801 | A * | 9/1995 | Anderson et al. | 257/202 |
| 5,598,347 | A | 1/1997 | Iwasaki | 364/491 |
| 5,889,329 | A * | 3/1999 | Rostoker et al. | 257/758 |
| 5,995,512 | A * | 11/1999 | Pogue, Jr. | 370/419 |
| 6,467,074 | B1 * | 10/2002 | Katsioulas et al. | 257/207 |
| 6,536,028 | B1 | 3/2003 | Katsioulas et al. | 716/17 |
| 7,137,080 | B2 | 11/2006 | Acar et al. | 716/2 |
| 7,178,114 | B2 | 2/2007 | Lin et al. | 716/3 |
| 7,360,191 | B2 | 4/2008 | Chang et al. | 716/6 |
| 7,402,897 | B2 | 7/2008 | Leedy | 257/678 |
| 7,418,683 | B1 | 8/2008 | Sonnard et al. | 716/5 |
| 7,478,354 | B2 | 1/2009 | McGrath et al. | 716/12 |
| 7,496,867 | B2 * | 2/2009 | Turner et al. | 716/133 |
| 7,557,618 | B1 | 7/2009 | Wik | 326/121 |

(Continued)

FOREIGN PATENT DOCUMENTS
EP    1862926 A2    5/2007

OTHER PUBLICATIONS

Jeong et al.; "Revisiting the linear programming framework for leakage power vs. performance optimization"; Publication Year: 2009; Quality of Electronic Design, 2009. ISQED 2009. Quality Electronic Design; pp. 127-134.*

(Continued)

*Primary Examiner* — Helen Rossoshek
(74) *Attorney, Agent, or Firm* — Christopher P. Maiorana, PC

(57) ABSTRACT

A storage medium recording a cell library having one or more cells that may be readable by a computer and may be used by the computer to design an integrated circuit. The one or more cells may have a physical dimension parameter and a channel width parameter. The physical dimension parameter may be a footprint of the one or more cells. The channel width parameter may have a minimum driver size and a maximum driver size. The channel width parameter may define a range within which a tool varies the channel width between the maximum driver size and the minimum driver size during a design flow of the integrated circuit based upon one or more power criteria without changing the footprint.

20 Claims, 6 Drawing Sheets

U.S. PATENT DOCUMENTS

| | | | |
|---|---|---|---|
| 7,563,678 B2 | 7/2009 | Koyama et al. | 438/275 |
| 7,673,260 B2 * | 3/2010 | Chen et al. | 716/106 |
| 7,966,596 B2 * | 6/2011 | Lu et al. | 716/119 |
| 2003/0141807 A1 * | 7/2003 | Kawase | 313/498 |
| 2008/0022235 A1 * | 1/2008 | Chew et al. | 716/2 |
| 2008/0079461 A1 * | 4/2008 | Lin et al. | 326/80 |
| 2009/0319969 A1 | 12/2009 | Zhang et al. | 716/5 |
| 2011/0133776 A1 * | 6/2011 | Mazure et al. | 326/38 |

OTHER PUBLICATIONS

Yoneno, Etsuji, et al., "Power and Performance Optimization of Cell-Based Designs with Intelligent Transistor Sizing and Cell Creation", EDP—2001 The Eight IEEE/DATC Electronic Design Process Workshop, Apr. 10, 2001, pp. 155-162.

* cited by examiner

US 8,196,086 B2

GRANULAR CHANNEL WIDTH FOR POWER OPTIMIZATION

FIELD OF THE INVENTION

The present invention relates to integrated circuit design generally and, more particularly, to a method and/or apparatus for implementing a granular channel width for power optimization.

BACKGROUND OF THE INVENTION

Complimentary metal-oxide-semiconductor (CMOS) integrated circuit (IC) power reduction is important because of costs associated with wasted power. Both power related product costs (i.e., in terms of power dissipation capability to handle high temperature environments) and power related operating costs are becoming differentiations in the market. Power consumption in a digital CMOS IC is considered either static (i.e., the power consumption continues regardless of system activity) or dynamic (i.e., the power is only consumed when switching activity occurs). Static power consumption in conventional digital CMOS processes is usually the result of transistors that do not act as perfect switches. The transistors are difficult to switch off fully. The transistors remain partially on and thus allow a leakage current to flow. The leakage current results in a continuous waste of power.

Static power consumption can be mitigated by using different switching thresholds for the transistors (i.e., the "Vt" of the transistor). Transistors with a higher Vt will have worse performance (i.e., the transistor is slower to switch on and has less drive current when on). However, transistors with a higher Vt have less power leakage when switched off. Multiple libraries with different Vt values allow designers to build ICs with targeted performance/power tradeoffs. The multiple libraries are said to be footprint compatible if the libraries are otherwise identical (i.e., pin connections are in the same locations for different Vt versions of the same function).

It would be desirable to implement a method and/or apparatus for a granular channel width for power optimization.

SUMMARY OF THE INVENTION

The present invention generally concerns a storage medium recording a cell library having one or more cells that may be readable by a computer and may be used by the computer to design an integrated circuit. The one or more cells may have a physical dimension parameter and a channel width parameter. The physical dimension parameter may be a footprint of the one or more cells. The channel width parameter may have a minimum driver size and a maximum driver size. The channel width parameter may define a range within which a tool varies the channel width between the maximum driver size and the minimum driver size during a design flow of the integrated circuit based upon one or more power criteria without changing the footprint.

The objects, features and advantages of the present invention may include providing a granular channel width for power optimization that may (i) allow a foundry independent approach for using granular channel widths to optimize performance and power, (ii) allow the design of a cell with a maximum driver size, a minimum driver size, and a number of intermediate driver sizes, while generally remaining within Design Rule Check (DRC) parameters, (iii) allow the design of a cell that may be characterized for power and performance at the minimum driver size, maximum driver size, and the intermediate driver sizes, (iv) create a lookup table so that power and performance may be estimated with any final driver size, (v) provide a tool that affords a large granularity of cells across the power and performance spectrum, (vi) remove large step functions in power and performance that prevent Leakage In Place Optimization (LIPO) tools from doing an optimal job, (vii) note information for use in redefining the cell with the appropriate diffusion (OD) area and device width, after the LIPO tool estimates the correct driver size for the best power/performance tradeoff, (viii) allow device width corrections to be done at any point in the design flow, (ix) introduce the ability to target dynamic power reduction via positive slack recovery late in the design flow with zero to minimal design impact and/or (x) introduce the ability to target static or dynamic power recovery as appropriate for the application.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Static power consumption may be mitigated by using different transistor channel lengths. For the libraries with different channel lengths to be footprint compatible, the libraries may all be designed to the dimensions of the largest channel length. Libraries may be created that offer several (e.g., three or more) channel length options and/or several (e.g., three or more) Vt options that may have the same footprint to permit power reduction and precise performance/power optimization.

Figure 1:
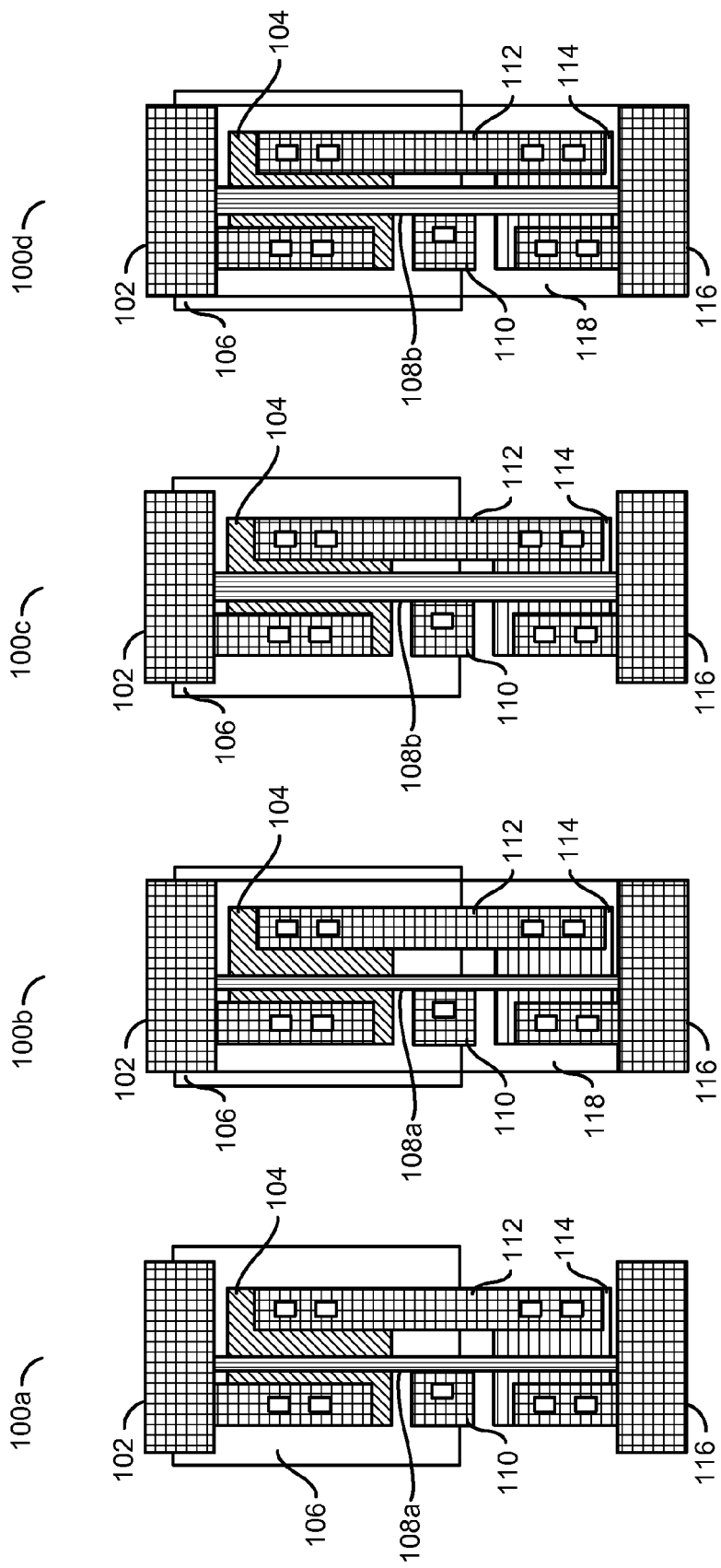
FIG. 1 is a diagram of example layouts for four cells with Vt and channel length variations.

Referring to FIG. 1, a diagram illustrating a variety of cells 100a-100d with Vt and channel length variations is shown. Each cell (or apparatus) 100a-100d may implement an inverter cell. The cells 100a-100d may comprise regions (or circuits) 102, regions (or circuits) 104, regions (or circuits) 106, regions (or circuits) 110, regions (or circuits) 112, regions (or circuits) 114, and regions (or circuits) 116. The cells 100a and 100b may comprise regions (or circuits) 108a. The cells 100c and 100d may comprise regions (or circuits) 108b. The cells 100b and 100d may comprise regions (or circuits) 118. The regions 102 may be Vdd power traces connected to drain portions of each cell 100a-100d. The regions 104 may be P+ diffusion regions that establish sources and drains of P-type transistors of each cell 100a-100d. The regions 106 may be N diffusion well portions of each cell 100a-100d. The regions 108a may be gate portions of each cell 100a and 100b. The regions 108b may be wide gate portions of each cell 100c and 100d. The regions 110 may be gate contact traces connected to the gates 108a or 108b of each cell 100a-100d. The regions 112 may be output terminals of each cell 100a-100d. The regions 114 may be N+ diffusion regions that establish sources and drains of N-type transistors of each cell 100a-100d. The regions 116 may be Vss power traces connected to source portions of each cell 100a-100d. The regions 118 may be Vt implant regions of each cell 100b and 100d.

The cell 100a generally illustrates a layout providing a minimum channel length, normal Vt inverter cell. The cell 100b generally provides a minimum channel length, high Vt inverter cell with a Vt implant region 118. The cell 100c generally provides an example layout illustrating an extended channel length, normal Vt inverter cell with the wide transistor gate 108b. The cell 100d generally provides an example layout illustrating an extended channel length, high Vt inverter cell with the wide transistor gate 108b and Vt implant region 118.

As technology migrates to smaller and smaller dimensions and associated design rules become more restrictive, offering footprint compatible channel length scaled libraries becomes more difficult. Some embodiments of the present invention may provide a methodology for defining Granular Channel Width (GCW) devices in normal cells. The GCW devices may be used to optimize power and performance in integrated circuit designs. Some embodiments also generally describe a method for automating the definition and use of GCW scaled versions of cells. Some embodiments may also provide procedures for the definition and creation of GCW cells that may be placed in an existing routed chip level database. The GCW cells may be used to maximize static and/or dynamic power recovery.

Transistor sizes may be built into the cell libraries that IC designers use. The design tools may optimize performance while minimizing power. The performance specifications for a particular application often suggest a choice of a functional cell that uses smaller transistors. The performance specifications may also include a reduced area for the cells. Cell libraries may define a P-channel transistor and an N-channel transistor of a unit size (e.g., the size of a 1× standard inverter). Multiple transistors in parallel may be utilized to gain more drive strength (e.g., performance). Cells that use smaller transistors may often be implemented by using fewer parallel transistors.

Smaller drive cells may be implemented by reducing the channel width instead of the number of parallel transistors. If the libraries generally are otherwise identical, (e.g., the physical dimensions may be similar and the pin connections may be in the same locations for different channel widths) the libraries generally are said to be "footprint compatible". Footprint compatible cells may be easily swapped anywhere, up to and including the last stages of the design flow to meet performance and power goals.

Figure 2:
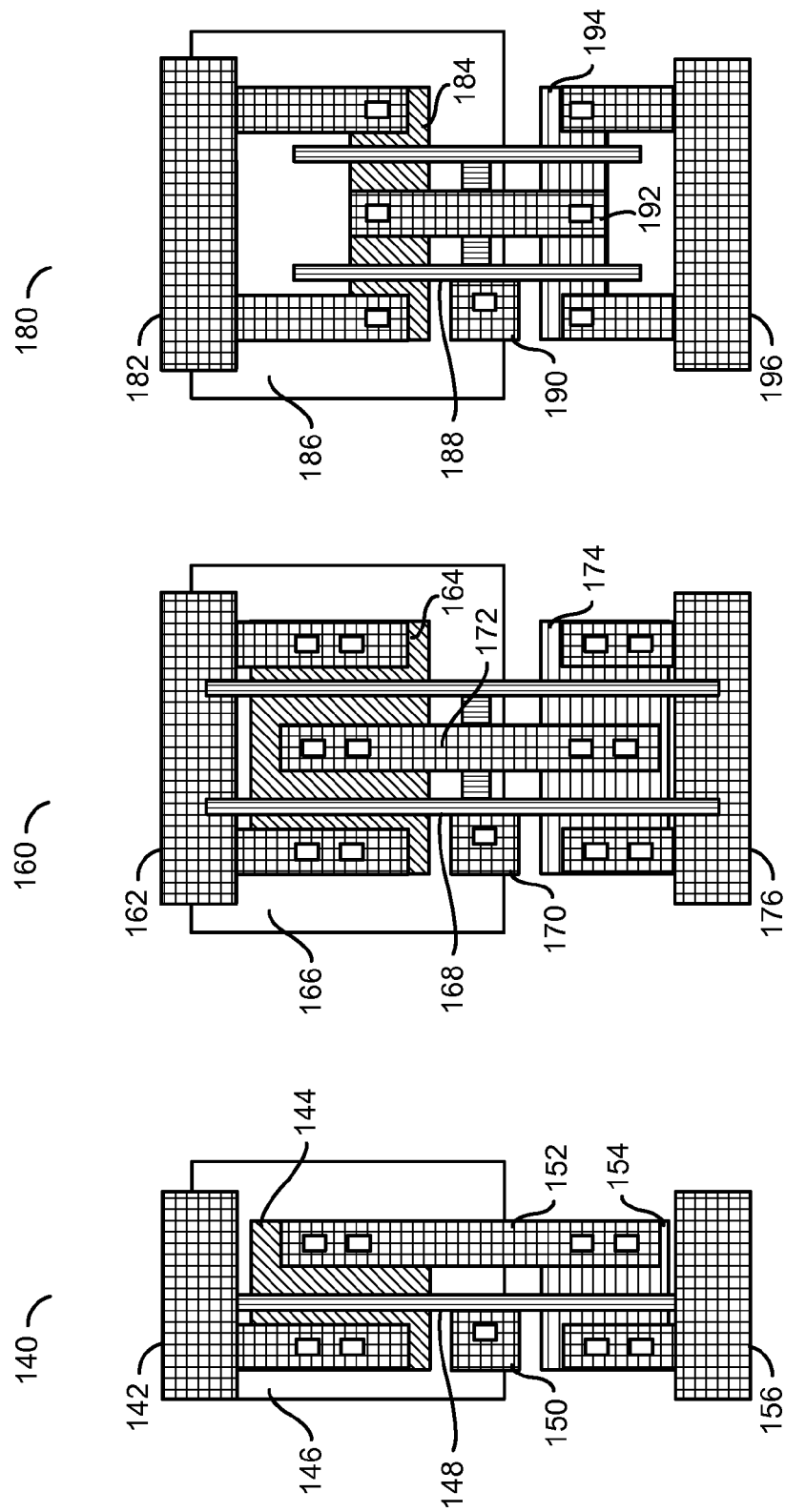
FIG. 2 is a diagram of an example of a 1× cell, a 2× cell, and a channel width scaled 1× cell (based on the 2× cell footprint)

Referring to FIG. 2, a block diagram of cells 140, 160, and 180 is shown. The cell (or apparatus) 140 may be a 1× drive inverter cell. The cell (or apparatus) 160 may be a 2× drive inverter cell. The cell (or apparatus) 180 may be a 1× drive inverter cell. The cell 140 may comprise a region (or circuit) 142, a region (or circuit) 144, a region (or circuit) 146, a region (or circuit) 148, a region (or circuit) 150, a region (or circuit) 152, a region (or circuit) 154 and a region (or circuit) 156. The region 142 may be a Vdd power trace connected to a drain portion of the cell 140. The region 144 may be a P+ diffusion region that establishes a source and a drain of a P-type transistor of the cell 140. The region 146 may be an N diffusion well portion of the cell 140. The region 148 may be a gate portion of the cell 140. The region 150 may be a gate contact connected to the gate portion 148 of the cell 140. The region 152 may be an output terminal of the cell 140. The region 154 may be an N+ diffusion region that establishes a source and a drain of an N-type transistor of the cell 140. The region 156 may be a Vss power trace connected to a source portion of the cell 140.

The cell 160 may comprise a region (or circuit) 162, a region (or circuit) 164, a region (or circuit) 166, a region (or circuit) 168, a region (or circuit) 170, a region (or circuit) 172, a region (or circuit) 174 and a region (or circuit) 176. The region 162 may be a Vdd power trace connected to a drain portion of the cell 160. The region 164 may be a P+ diffusion region that establishes a source and a drain of a P-type transistor of the cell 160. The region 166 may be an N diffusion well portion of the cell 160. The region 168 may be a gate portion of the cell 160. The region 170 may be a gate contact connected to the gate portion 168 of the cell 160. The region 172 may be an output terminal of the cell 160. The region 174 may be an N+ diffusion region that establishes a source and a drain of an N-type transistor of the cell 160. The region 176 may be a Vss power trace connected to a source portion of the cell 160.

The cell 180 generally comprises a channel width scaled 1× driver cell based on the footprint of the cell 160. The cell 180 may comprise a region (or circuit) 182, a region (or circuit) 184, a region (or circuit) 186, a region (or circuit) 188, a region (or circuit) 190, a region (or circuit) 192, a region (or circuit) 194 and a region (or circuit) 196. The region 182 may be a Vdd power trace connected to a drain portion of the cell 180. The region 184 may be a P+ diffusion region that establishes sources and drains of P-type transistors of the cell 180. The region 186 may be an N diffusion well portion of the cell 180. The region 188 may be gate portions of the cell 180. The region 190 may be a gate contact connected to the gate portions 188 of the cell 180. The region 192 may be an output terminal of the cell 180. The region 194 may be an N+ diffusion region that establishes sources and drains of N-type transistors of the cell 180. The region 196 may be a Vss power trace connected to source portions of the cell 180.

The cell 180 illustrates a space above the diffusion region 184 and below the diffusion region 194. The channel width scaled layout may have similar performance and leakage characteristics to the cell 140, but may be footprint compatible (e.g., may have the same physical dimensions and pin locations) to the cell 160. Therefore, so long as performance and power criteria are generally met, the cell 180 and the cell 160 may be swapped for each other in the layout of the final IC design.

Figure 3:
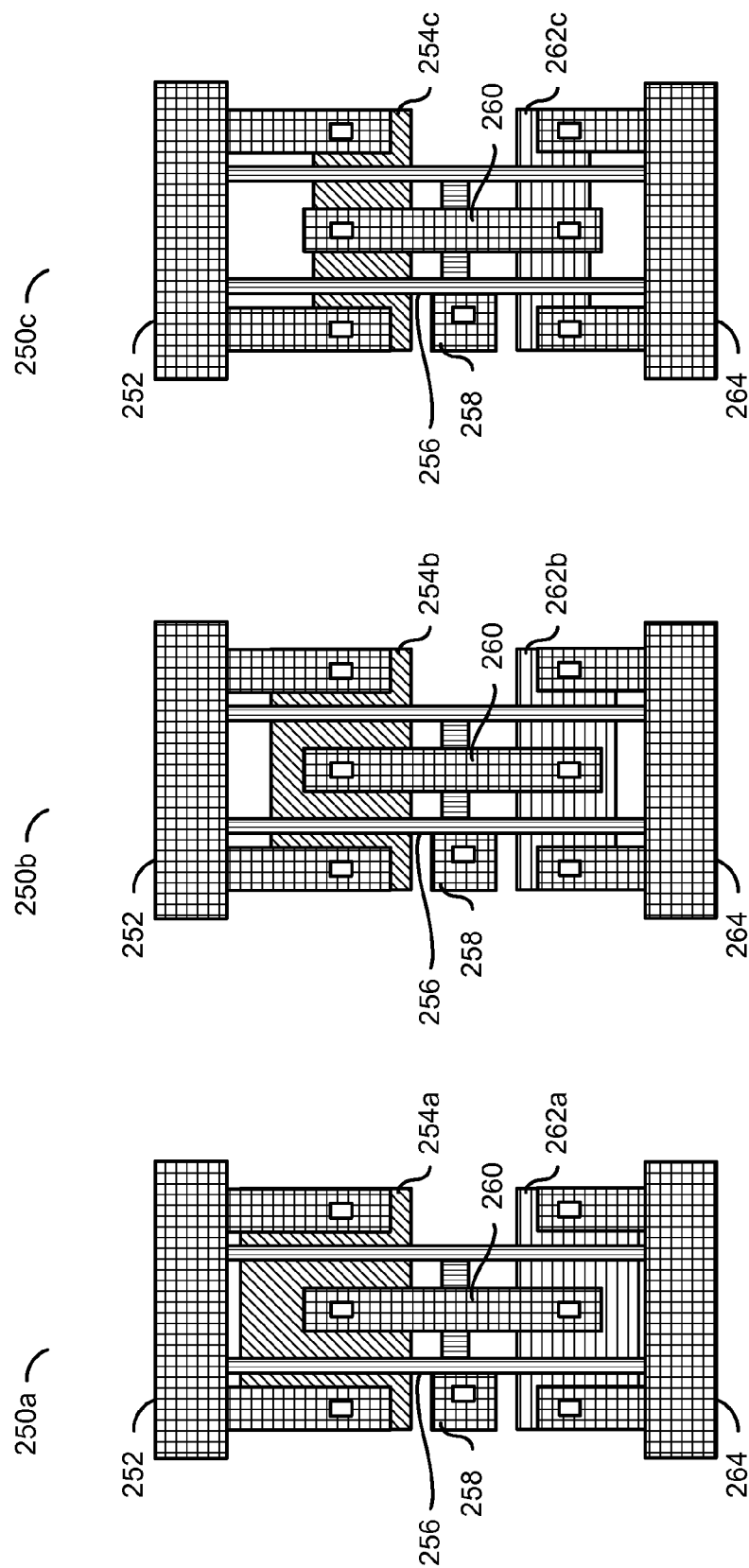
FIG. 3 is a diagram of an example of three cells in accordance with a preferred embodiment of the present invention.

Referring to FIG. 3, a block diagram of cells 250a-250c is shown in accordance with a preferred embodiment of the present invention. The cell 250a may be implemented as a 2× drive inverter cell. The cell 250b may be implemented as a 1.5× drive inverter cell based on the cell 250a footprint. The cell 250c may be implemented as a 1× drive inverter cell based on the cell 250a footprint. The cells 250a-250c may comprise regions (or circuits) 252, regions (or circuits) 256, regions (or circuits) 258, regions (or circuits) 260, and regions (or circuits) 264. The cell 250a may comprise a region (or circuit) 254a and a region (or circuit) 262a. The cell 250b may comprise a region (or circuit) 254b and a region (or circuit) 262b. The cell 250c may comprise a region (or circuit) 254c and a region (or circuit) 262c.

The regions 252 may be Vdd power traces connected to drain portions of each cell 250a-250c. The regions 254a-254c may be P+ diffusion regions that establish sources and drains of P-type transistors of each cell 250a-250c. The regions 256 may be gate portions of each cell 250a-250c. The regions 258 may be gate contacts connected to the gate portions 256 of each cell 250a-250c. The regions 260 may be output terminals of each cell 250a-250c. The regions 262a-262c may be N+ diffusion regions that establish sources and drains of N-type transistors of each cell 250a-250c. The regions 264 may be Vss power traces connected to the source portions of the cells 250a-250c. In general, differences between the cells 250a-250c may be the OD area of the regions 254a-254c and the regions 262a-262c and the resulting power/performance profiles of the cells 250a-250c.

Figure 4:
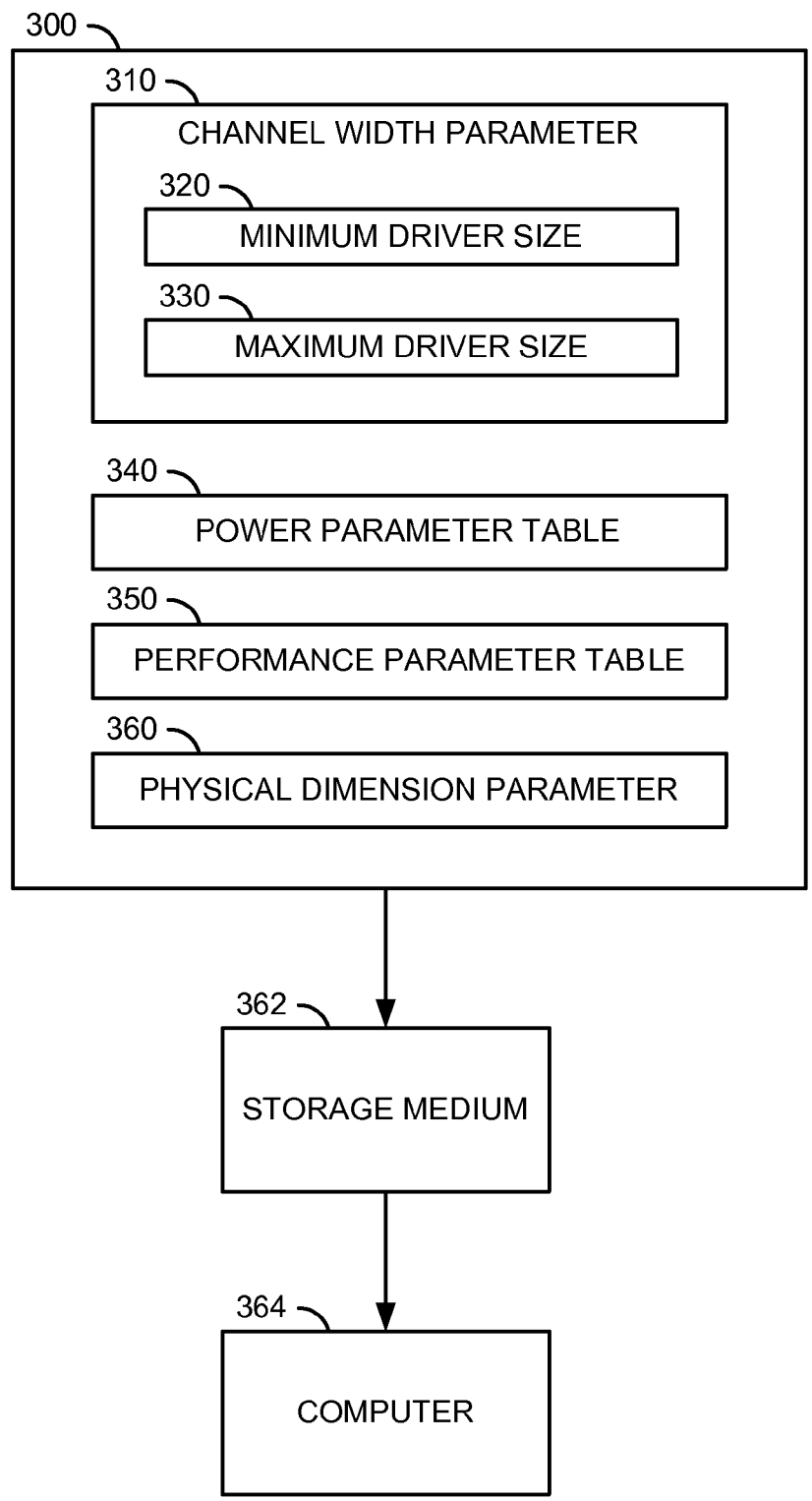
FIG. 4 is a diagram of an example of the structure of a cell.

Referring to FIG. 4, a block diagram of an example of a structure 300 of a cell is shown. The cell may be any one or more of the cells 100a-100d, 140, 160, 180, and/or 250a-250c. The structure 300 generally comprises a parameter (or criteria) 310, a parameter (or criteria) 320, a parameter (or criteria) 330, a lookup table (or criteria) 340, a lookup table (or criteria) 350, and a parameter (or criteria) 360. The structure 300 may be associated with a block (or circuit) 362, and a block (or circuit) 364. The parameter 310 may be defined as a channel width parameter of the structure 300 (e.g., the width of regions 254a and/or 262a). The parameter 320 may be defined as a minimum driver size of the channel width parameter 310. The parameter 330 may be defined as a maximum driver size of the channel width parameter 310. The lookup table 340 may store the power criteria of the structure 300. The lookup table 350 may store the performance criteria (e.g., propagation delay, rise time, fall time, etc.) of the structure 300. The parameter 360 may be defined as a physical dimension parameter of the structure 300. The parameter 360 generally defines a footprint for the structure 300. The block 362 may comprise a non-transitory storage medium. The block 364 may comprise a computer.

The structure 300 may be defined within a cell library and the cell library may be recorded on the storage medium 362 that may be readable by the computer 364. The structure 300 may be used to design an integrated circuit. The structure 300 may have two or more parameters including, but not limited to, the physical dimension parameter 360 and the channel width parameter 310. The channel width parameter 310 may include the maximum driver size 330 and the minimum driver size 320. The channel width of the diffusion region (e.g., the diffusion regions 254a-254c and/or 262a-262c) may be varied between the maximum driver size 330 and the minimum driver size 320 by a tool (e.g., a computer program configured to design integrated circuits). The tool may vary the channel width parameter 310 during a design flow of the integrated circuit based on one or more power criteria of lookup table 340, one or more performance criteria of lookup table 350 or a combination of both. As further illustrated in connection with FIG. 5, the structure 300 may comprise a description that includes one or more power criteria and performance criteria of lookup tables 340 and/or 350. The channel width of the cell may comprise a diffusion area (OD) which may be varied to meet a drive strength for a particular application. The physical dimension parameter 360 may comprise a footprint for the structure 300 such that the footprint may remain the same independent of any variation of the channel width of the structure 300. Since the footprint of the structure 300 may remain the same, the structure 300 may be swapped for a different channel width cell at any point in the design flow. The cell may be swapped before or after the cell has been placed and routed.

Figure 5:
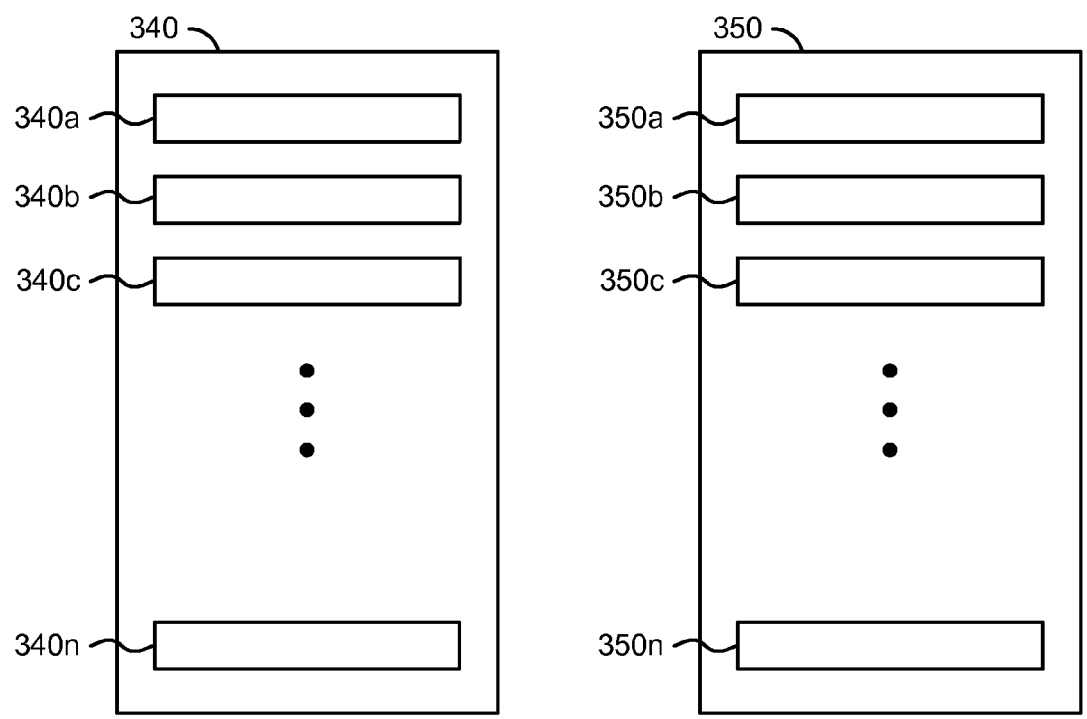
FIG. 5 is a diagram of an example of lookup tables for power parameters and performance parameters of a cell.

Referring to FIG. 5, a diagram of an example of lookup tables 340 and 350 is shown. The lookup table 340 generally comprises a number of parameters (or criteria) 340a-340n. The parameters 340a-340n may be defined as a plurality of different power criteria that form the lookup table 340. The values of parameters 340a-340n may be defined in a description of the structure 300. The lookup table 350 generally comprises a number of parameters (or criteria) 350a-350n.

The parameters 350a-350n may be defined as a plurality of different performance criteria that form the lookup table 350. The values of parameters 350a-350n may be defined in a description of the structure 300. During a design flow of an integrated circuit, a design tool may use the lookup tables 340 and/or 350 to optimize a power usage and/or a performance of the cell.

Figure 6:
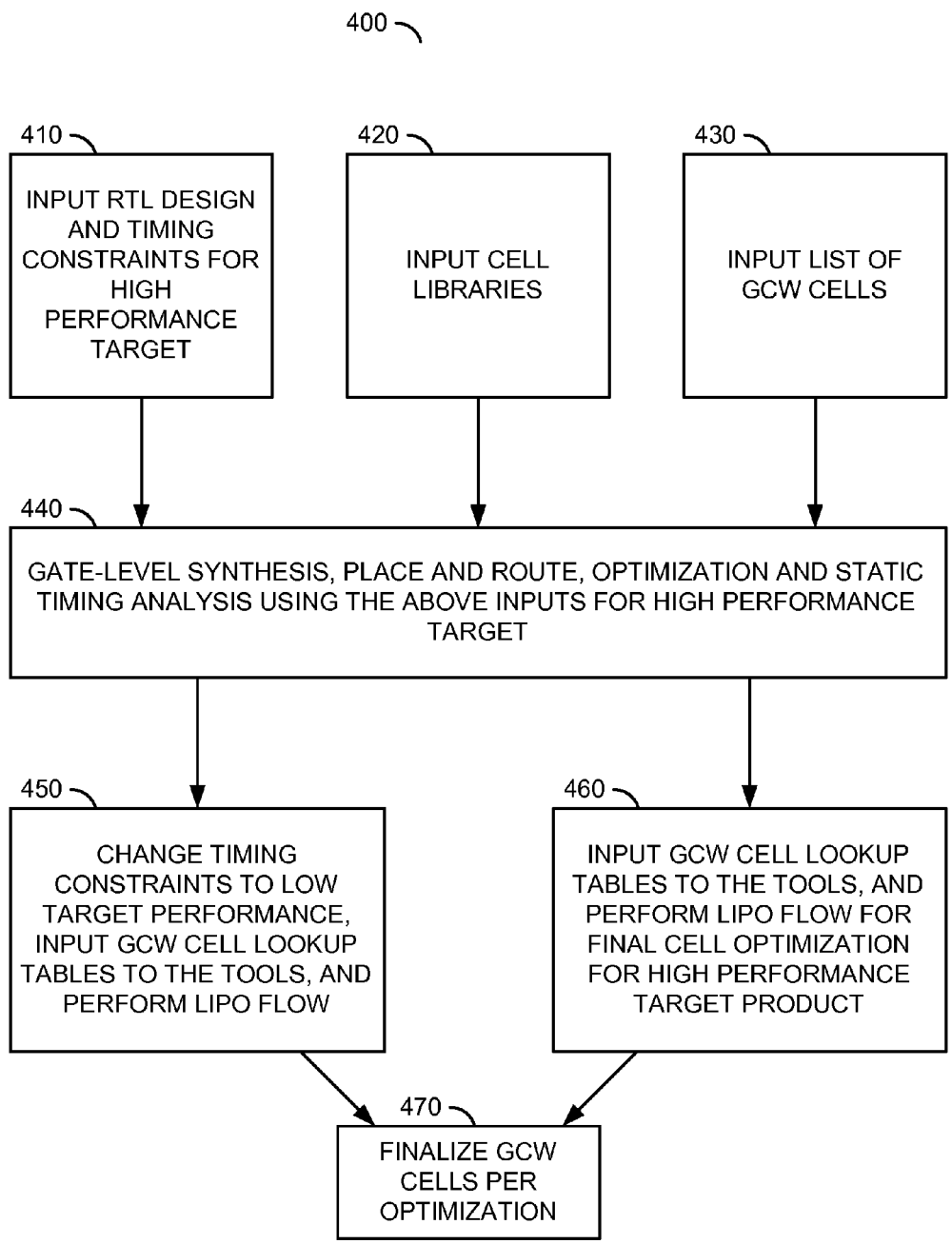
FIG. 6 is a flow chart of a method for optimizing power using a granular channel width in designing an integrated circuit.

Referring to FIG. 6, a flow diagram is shown illustrating a process (or method) 400 for an example circuit design flow. The process 400 generally comprises a step (or state) 410, a step (or state) 420, a step (or state) 430, a step (or state) 440, a step (or state) 450, a step (or state) 460, and a step (or state) 470. The step 410 may copy a Register Transfer Level (RTL) design and timing constraints for high performance targets into one or more design tools. The design tools may be executed by the computer 364. The step 420 may copy cell libraries into the design tools. The step 430 may copy a list of GCW cells into the design tools. The step 440 may use the inputs from the steps 410-430 for gate-level synthesis, place and route, optimization, and static timing analysis for the high performance target. The step 450 may change the timing constraints to a low target performance, present the GCW cells to the design tools, and perform a Leakage In Place Optimization (LIPO) flow for the low performance target product. The step 460 may present the GCW cells to the design tools and perform an LIPO flow for final cell optimization for the high performance target product. The step 470 may fix the channel widths of the GCW cells according to the cell optimizations determined in the step 450 and/or the step 460. The LIPO may be a timing driven leakage power reduction process. In the LIPO, paths that have adequate timing margins in a Static Timing Analysis (STA) may have cells in the logic path swapped for lower power versions of the same functionality. After the LIPO processing, the design may achieve a lower power and have smaller timing margins as the low power cells are generally slower than the cells that were replaced.

In general, the definition of which cells and devices within a cell may be scaled granularly during LIPO may be a part of the step 420 and the step 430. In an example, common combinational gates may be candidates for optimization whereas complex flip-flops may not. The characterization time of the complex flip-flops may be high and the number of devices in which a granular scaling should be allowed may be low (e.g., only the output driver).

For each granular channel width cell identified as being capable of LIPO optimization, the layout may be constructed in accordance with the cells (e.g., 250a-250c). As a result, the minimum driver size, maximum driver size and a number of intermediate driver sizes may be DRC clean. For device width variations, a common P:N channel width ratio should generally be maintained as the OD areas vary. Characterizations may be run on the minimum sizes and the maximum sizes (e.g., cell 250c and cell 250a respectively). A number of intermediate driver sizes may be utilized between the minimum driver size and the maximum driver size. One or more lookup table models (e.g., lookup tables 340 and/or 350 as illustrated in FIG. 5) may be created with adequate power/ performance/capacitance information for LIPO. The data in the lookup tables 340 and/or 350 may be guardbanded with margins to account for inaccuracy due to layout stress effect changes while modifying the OD areas.

LIPO may know the scaling information in the lookup tables 340 and/or 350 when LIPO is executed (e.g., by the computer 364) in order to determine the best channel width, channel length, and/or threshold voltage for power/performance for each of the GCW scalable cells. Using the one or more lookup tables 340 and/or 350, the product of the LIPO may be (i) footprint compatible cell swap information for non-GCW cells and (ii) recommended channel widths, channel lengths, and/or threshold voltages for the GCW cells to provide an optimal power/performance tradeoff.

The methodology described above may be used in system-on-a-chip (SOC) development to optimize power/performance toward the end of the design cycle. The methodology of the present invention may also be used to migrate a high performance design to lower performance targets while maintaining a routed chip level database. Some products may be designed for multiple performance/power targets. As a result, the same software may be used in the final product but the high volume, low performance applications may not be overburdened by the design for the higher performance low volume applications.

In an example (e.g., the disk-drive storage industry), a Read-Channel IC and a Hard-Disk-Controller IC may call for identical functionality. However, a commercial Enterprise product may need twice the performance versus a consumer battery-powered notebook product. In general, the consideration of the Enterprise product versus the consumer product may use multiple development efforts. Each product market may utilize a fixed development cost for a market-targeted product. Alternately, the lower performance application may be forced to carry the extra power overhead induced by the higher performance application. However, with GCW cells, a flow may be demonstrated which may allow a single development cost to be leveraged for entry into additional product segments. The resulting optimization using GCW cells may avoid the large Vt type step functions that commonly limit the effectiveness of the LIPO.

Channel width scaled libraries may look like libraries using many parallel, small width transistors. However, the use of GCW scaled libraries for multiple product development may provide functionally similar products with different performance/power capabilities. Some embodiments of the present invention may allow dynamic power recovery in addition to static power recovery at the foundry. Some embodiments may also be of interest in 28 nanometer (nm) technology where footprint compatible channel length scaling may be more challenging than in 40 nm technology. Some embodiments may also provide new differentiating capabilities in dynamic power reduction and extended static power reduction. Some embodiments may also add a fine-grained solution to existing LIPO tools. Some embodiments may also extend LIPO and similar tools to allow reduction of dynamic power loss via in-place optimization. Some embodiments may be used in connection with existing products, or may enable multiple-market product development for a small incremental development cost.

The functions performed by the diagram of FIGS. 1-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A storage medium recording a cell library comprising one or more cells that are readable by a computer and used by said computer to design an integrated circuit, a given one of said cells comprising:
   a footprint; and
   a channel width parameter of a channel width, wherein (i) said channel width parameter defines a range within which a tool varies said channel width in said given cell during a design flow of said integrated circuit based upon one or more power criteria without changing said footprint of said given cell and (ii) said cell library further comprises a lookup table comprising (a) said power criteria, (b) one or more performance criteria or (c) a combination of both said power criteria and said performance criteria.

2. The storage medium according to claim 1, wherein said lookup table bounds said tool in adjusting (i) a power usage of said given cell, (ii) a performance of said given cell, or (iii) a combination of both said power usage and said performance of said given cell.

3. The storage medium according to claim 1, wherein said lookup table bounds said tool in adjusting (i) a static power usage of said given cell, (ii) a dynamic power usage of said given cell, or (iii) a combination of both said static power usage and said dynamic power usage of said given cell.

4. The storage medium according to claim 1, wherein said cell library comprises a plurality of said given cells.

5. The storage medium according to claim 1, wherein said channel width parameter comprises a width of a diffusion area in said given cell.

6. The storage medium according to claim 1, wherein a particular channel width of said given cell is adjusted to a different channel width after said given cell has been placed and routed.

7. A method of creating a cell library comprising one or more cells used to design an integrated circuit, said method comprising the steps of:
 (A) storing a footprint of a given one of said cells in a storage medium using a computer; and
 (B) storing a channel width parameter of a channel width in said given cell in said storage medium, wherein (i) said channel width parameter defines a range within which a tool varies said channel width in said given cell during a design flow of said integrated circuit based upon one or more power criteria without changing said footprint of said given cell and (ii) said cell library further comprises a lookup table comprising (a) said power criteria, (b) one or more performance criteria or (c) a combination of both said power criteria and said performance criteria.

8. The method according to claim 7, wherein said lookup table bounds said tool in adjusting (i) a power usage of said given cell, (ii) a performance of said given cell, or (iii) a combination of both said power usage and said performance of said given cell.

9. The method according to claim 7, wherein said lookup table bounds said tool in adjusting (i) a static power usage of said given cell, (ii) a dynamic power usage of said given cell, or (iii) a combination of both said static power usage and said dynamic power usage of said given cell.

10. The method according to claim 7, wherein a dynamic power usage of said given cell is varied by said tool per a positive slack recovery.

11. The method according to claim 7, wherein said channel width parameter comprises a width of a diffusion area in said given cell.

12. The method according to claim 7, wherein a particular channel width of said given cell is adjusted to a different channel width after said given cell has been placed and routed.

13. A method of adjusting power in a design of an integrated circuit, said method comprising the steps of:
 (A) performing a place and route of a plurality of cells in said design using a computer, wherein (i) a given one of said cells comprises (a) a footprint and (b) a channel width parameter of a channel width and (ii) said channel width parameter defines a range within which a tool varies said channel width in said given cell based on one or more power criteria without changing said footprint of said given cell;
 (B) adjusting said channel width in said given cell with said tool; and
 (C) finalizing said channel width in said given cell to create a final design of said integrated circuit, wherein a cell library of said cells comprises a lookup table comprising (i) said power criteria, (ii) one or more performance criteria or (iii) a combination of both said power criteria and said performance criteria.

14. The method according to claim 13, wherein said tool adjusts said performance criteria of said given cell.

15. The method according to claim 13, wherein said lookup table bounds said tool in adjusting (a) a power usage of said given cell, (b) a performance of said given cell, or (c) a combination of both said power usage and said performance of said given cell.

16. The method according to claim 13, wherein said lookup table further comprise a plurality of power usages of said given cell and a plurality of performances of said given cell.

17. A storage medium recording a cell library comprising one or more cells that are readable by a computer and used by said computer to design an integrated circuit, a given one of said cells comprising:
 a footprint; and
 a channel width parameter of a channel width, wherein (i) said channel width parameter defines a range within which a tool varies said channel width in said given cell during a design flow of said integrated circuit based upon one or more power criteria without changing said footprint of said given cell and (ii) said cell library further comprises a lookup table that bounds said tool in adjusting (a) a static power usage of said given cell, (b) a dynamic power usage of said given cell, or (c) a combination of both said static power usage and said dynamic power usage of said given cell.

18. The storage medium according to claim 17, wherein said given cell further comprises one or more performance criteria.

19. A method of adjusting power in a design of an integrated circuit, said method comprising the steps of:
 (A) performing a place and route of a plurality of cells of a cell library in said design using a computer, wherein (i) a given one of said cells comprises (a) a footprint and (b) a channel width parameter of a channel width and (ii) said channel width parameter defines a range within which a tool varies said channel width in said given cell based on one or more power criteria without changing said footprint of said given cell;
 (B) adjusting said channel width in said given cell with said tool; and
 (C) finalizing said channel width in said given cell to create a final design of said integrated circuit, wherein said cell library comprises one or more lookup tables comprising (i) a plurality of power usages of said given cell and (ii) a plurality of performances of said given cell.

20. The method according to claim 19, wherein said given cell further comprise one or more performance criteria.

* * * * *